Patented June 27, 1950

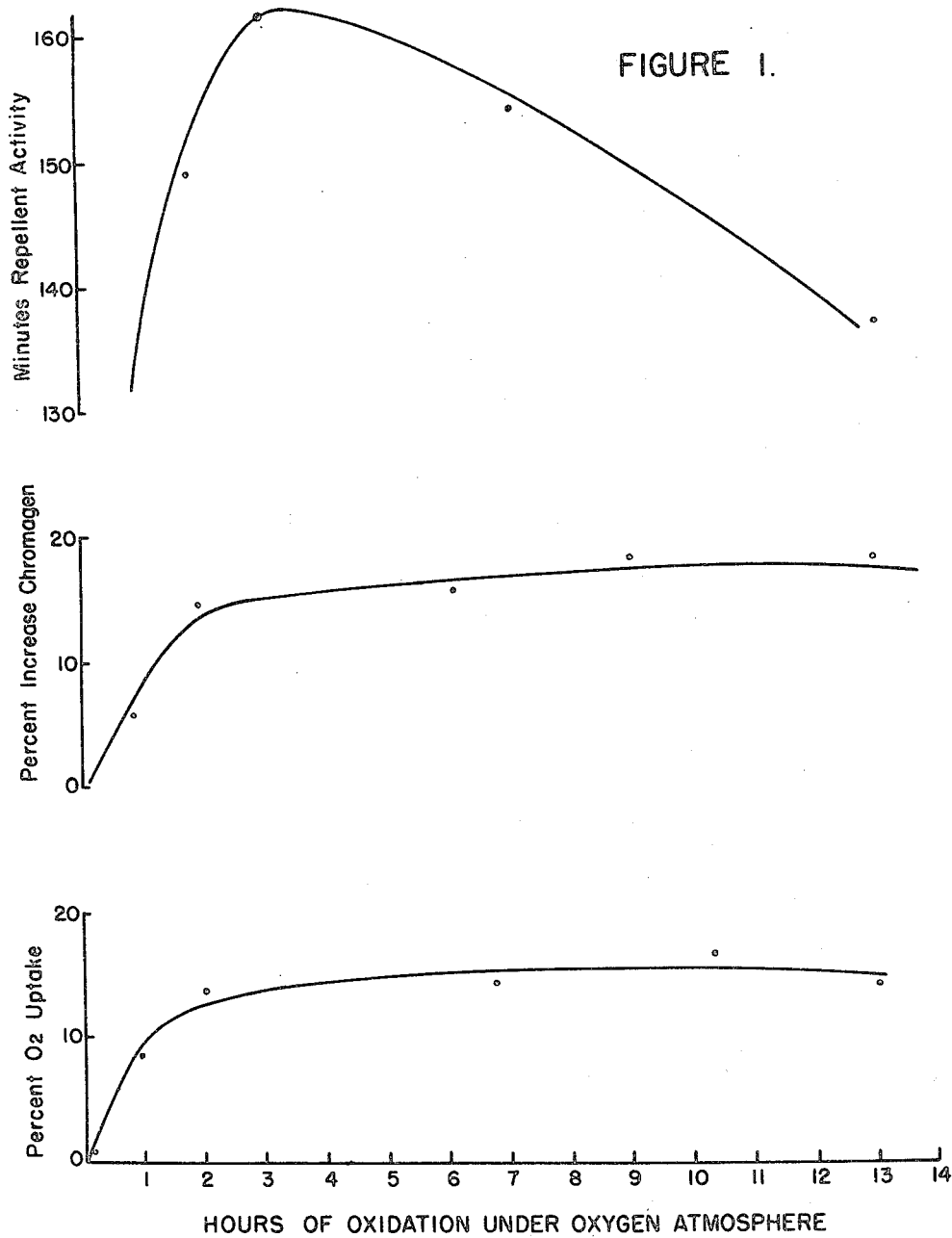

2,512,675

UNITED STATES PATENT OFFICE 2,512,675

INSECT REPELLENT MIXTURES COMPRISING A HYDROGENATED DIPHENYL AND A HYDROGENATED NAPHTHOL

Michel Pijoan and Leo A. Jachowski, Jr., United States Navy

Application August 22, 1945, Serial No. 612,117

4 Claims. (Cl. 167—31)

(Granted under the act of March 3, 1883, as amended April 30, 1928; 370 O. G. 757)

This invention relates to improved insect repellents, particularly hydrogenated naphthols and hydrogenated diphenyls, where an interaction between repellents and solvents increases repellent effectiveness.

In recent years the problem of developing effective insect repellents, particularly those effective against disease-carrying insects such as mosquitoes, has become of critical importance. Heretofore a number of repellents have been employed which usually comprised esters of aromatic or aliphatic compounds such as, for example; dimethyl phthalate, 2-ethyl 1, 3 hexanediole) and Indalone (a,a'-dimethyl-a-carbon butoxy dihydro gamma pyrone).

In actual use, these preparations have been found to be unsatisfactory for a number of reasons. Not only were these compounds cosmetically unacceptable but it was ascertained that the loss of repellent properties when applied to the sweating skin was very rapid which therefore renders these substances unsuited for tropical use where they are most needed. Futhermore, these compounds did not repel for any appreciable period of time. For example, it has been found that it is substantially impossible to prolong the effective duration of dimethyl phthalate or Rutgers 612 under simulated tropical conditions for a period of more than about two hours.

As a result of tests under simulated tropical conditions and actual field use, it has been ascertained that there are certain definitely attainable criteria which characterize an effective insect repellent for use on the human being. Such repellents should be readily applied to the skin, be odorless and cosmetically acceptable. Finally, the repellent employed should be effective for a prolonged period of time under conditions of high humidity and temperature as encountered in the tropics. It is particularly desirable that such repellent-bearing vehicles should be substantially insoluble in water and perspiration.

In the accompanying drawing Fig. 1 is a graph illustrating the effect of oxidation of beta tetralol on mosquito repellency.

It has been found that repellents, satisfying the above requirements to a substantial degree may be produced. The repellents discussed herein were evaluated against Aedes aegypti mosquitoes under simulated tropical conditions, namely, 90° F. dry bulb and 80° F. wet bulb. This species was selected because of the ease of rearing, under laboratory conditions, and also because of the cosmopolitan character of these mosquitoes as vectors of disease. The tests recorded herein were made only when the biting rate of the mosquitoes exceeded 20 bites per minute on an untreated arm. The tests were made by introducing the forearm covered with the repellent agent into a cage containing approximately 800 mosquitoes from seven to fourteen days old. In all tests 1 ml. of the repellent preparation was applied to the skin area extending from wrist to elbow. The test consisted of a periodic 5-minute exposure period of the treated arm to the mosquitoes. The effective duration or repellency of the preparation was taken to be the time interval between the application of the repellent to the arm and the first mosquito bite on the subject. However, in order to check this period the test was continued until at least a second bite occurred. In the testing procedure each material was tested at least twice under the above described conditions. It has been found from extensive practice that if the results of the two tests agreed within a period of thirty minutes, no further tests were required. However, if the variation between bites exceeded such interval, a series of tests was performed and the results averaged.

The earlier tests indicate that certain repellents, i. e., Rutgers #612 could have their protection period enhanced by the addition of relatively non-repellent solvents. Thus, when this repellent is mixed with benzyl alcohol the following results were obtained:

Table 1.—*The effect of benzyl alcohol on the repellent action of Rutgers #612*[1]

[Environmental conditions 80° F. dry bulb, 70° F. wet bulb.]

| Rutgers #612, parts | Benzyl alcohol, parts | Duration of repellent minutes | Synergic Index T mixture / (T sol. $f$ + T solv. (1-$f$)) | Repellent Index T mixture / T solute |
|---|---|---|---|---|
| 1.0 | 0.0 | 95 | 1.0 | 1.0 |
| 0.9 | 0.1 | 101 | 1.15 | 1.06 |
| 0.8 | 0.2 | 251 | 3.03 | 2.64 |
| 0.7 | 0.3 | 167 | 2.20 | 1.76 |
| 0.6 | 0.4 | 112 | 1.60 | 1.19 |
| 0.5 | 0.5 | 110 | 1.70 | 1.16 |
| 0.4 | 0.6 | 83 | 1.50 | 0.87 |
| 0.3 | 0.7 | 57 | 1.20 | 0.60 |
| 0.2 | 0.8 | 52 | 1.20 | 0.55 |
| 0.1 | 0.9 | 50 | 1.35 | 0.53 |
| 0.0 | 1.0 | 30 | 1.0 | 0.31 |

[1] Fifty-two separate tests were performed with benzyl alcohol with comparable results.

Results were obtained with other solvents and the effect of these solvents was either to increase the effectiveness (synergism) or to decrease the effectiveness (antagonism).

If by adding solvent to pure solute in some specified proportion makes T mixture greater than T solute or T solvent, the practical measure is one which determines the degree of enhancement by the ratio, where T represents the time of protection in minutes.

$$\frac{\text{T mixture}}{\text{T solute}} \text{ equals repellent index (RI)}$$

But it is important to note that this does not take into account the proportions of solvent or solute or the repellent activity of the solvent. It does not disclose the proportionate effectiveness of the ingredients.

It is apparent that some new relationship (equation) must be established. The fraction of solvent and solute can be designated by the symbol $(f)$ and the volume of the solute in a mixture can be referred to as $f$ and the proportion of solvent as $1-f$. And since the effects of both solvent and solute are not necessarily additive and the ratio of the two quantities are an expression of interaction with reference to the proportional repellent periods of the components the following expression is used:

Synergic index (SI) equals $$\frac{\text{T mixture}}{\text{T solute } (f) \text{ plus } (1-f) \text{ T solvent}}$$

The synergic index has been found to be the only useful measure in the study of mixtures of repellents. As such it can be related to the repellent index as follows:

$$\text{SI equals } \frac{\frac{\text{T mixture}}{\text{T solute}}}{f \text{ plus } (1-f) \frac{\text{T solvent}}{\text{T solute}}} \text{ equals}$$

$$\frac{\text{RI}}{f + (1-f) \frac{\text{T solvent}}{\text{T solute}}}$$

or the repellent index equals $$(\text{SI}) \ f \text{ plus } (1-f) \frac{\text{T solvent}}{\text{T solute}}$$

A synergic index of greater than 1 indicates that a measurable degree of interaction has occurred in the direction of enhancing the repellent action. A value of less than 1 indicates that the opposite is true. From studies such as these it was found that the repellent action of Rutgers #612 and dimethyl phthalate could be doubled when diluted with certain selected relatively non-repellent solvents. However, this increase was not sufficient to attain the period of protection desired in the tropics.

As a result of extensive experimentation, it was ascertained that organic compounds which comprised a nucleus consisting of hydrogenated naphthols and hydrogenated diphenyls possess the potential desirable repellency and that when these are mixed together or with other selected solvents, the repellent activity is increased.

An intensive investigation of the broad problem of mosquito repellency and collateral subjects such as insecticides, miticides and parasiticides has disclosed that all of these compounds present a certain common characteristic factor, namely, that they comprise essentially diphenyl or naphthol compounds. The validity of this postulate can be appreciated from a consideration of the effective function of derivatives of these nuclei employed as mosquito repellents. The ineffectiveness of the heretofore best known mosquito repellents, namely, dimethyl phthalate and Rutgers 612 has been explained. It has been ascertained that invoking the broad principles above outlined, mosquito repellents of a considerably greater effectiveness may be produced. Considered generically these fall within the broad genera of naphthols and diphenyls. Considered in a more specific sense these improved repellents comprise essentially, partially, or wholly hydrogenated naphthols and derivatives thereof as well as hydrogenated diphenyls and their derivatives. The effectiveness of this general group can be appreciated from a consideration of the repellent action of certain typical hydrogenated naphthols and hydrogenated diphenyls. The striking efficacy of this class of compounds against terrestrial arthropods as compared to those heretofore suggested will be more fully appreciated from a consideration of actual tests conducted under the conditions heretofore set forth.

Effective insect repellents are produced by hydrogenation of the beta naphthol nucleus. An effective number of this group is 1,2,3,4-tetrahydro beta naphthol which we herein designate as beta tetralol.

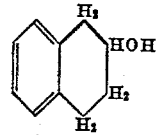

This compound may be prepared by the hydrogenation of beta naphthol according to the synthesis described by N. Atkins, Journal of American Chemical Society 63; 741 (1941).

Preparation of 1,2,3,4-tetrahydro beta naphthol is as follows: Three hundred grams of beta naphthol were dissolved in absolute ethyl alcohol to a volume of 550 ml. To this was added 37 grams of copper chromite (catalyst) and the mixture subjected to 5000 pounds pressure of hydrogen in a hydrogenator at room temperature. The hydrogenator was then heated to 190° C. and rotated. The reaction was continued until the theoretical amount of hydrogen (4 mols.) was absorbed (3400 lb. final pressure) and then cooled. The compound was then removed, the catalyst filtered out and the alcohol separated by distillation. The pure compound was then obtained by fractional distillation between 135–140° C. at a vacuum of 15 mm. Hg. The reaction can be expressed as follows:

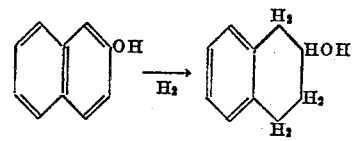

Freshly prepared beta tetralol is a clear somewhat viscous odorless liquid which develops a yellowish color in about forty-eight hours. The development of chromogen is related to the oxidation of this compound and its polymerization to hydro peroxides. It is to be observed that the repellent action of the partially oxidized or polymerized compound is materially greater than that of the freshly prepared or unoxidized compound; however, as the oxidation progresses, which is indicated by a change in color from yellow to red, the repellent action is decreased. This appears to be due to the oxidation of beta tetralol with the formation of hydro peroxides resulting in polymerization. The mosquito repellent activity is related to oxidation of beta tetralol as shown in the graph of the drawing.

Another fraction resulting from the hydrogenation of beta naphthol is 5,6,7,8-tetra hydro, beta naphthol prepared according to the synthesis previously described, this was also tested under the conditions specified and displayed a protection period of forty minutes. While this period was considerably less than beta tetralol it still demonstrates the characteristic repellency of this type of compound.

The hydrogenation of alpha naphthol results in the formation 1, 2, 3, 4-tetra hydro alpha naphthol

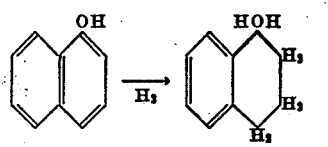

and 5,6,7,8-tetra hydro alpha naphthol.

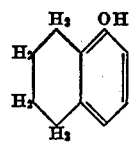

Hydrogenation of alpha naphthol was performed in a similar manner to that used for beta naphthol. The manner in which the resulting hydrogenated naphthols are separted is herewith described since this cannot be accomplished by fractional distillation because the hydrogenated compounds have the same boiling points. Separation of 5,6,7,8-tetra hydro alpha naphthol from 1,2,3,4-tetra hydro alpha naphthol is accomplished by dissolving the crude product in ether and treating it with 10 per cent sodium hydroxide solution. The ether layer was collected, the ether removed by boiling and the 1,2,3,4-tetra hydro alpha naphthol distilled at a vacuum of 2 mm. Hg at 102° C. The alkaline solution containing the hydroxy compound 5,6,7,8-tetra hydro alpha naphthol was collected, acidified with hydrochloric acid and the hydrogenated naphthol crystallized in boiling water. This compound had a boiling point of 102° C.

Each of these compounds were tested in the manner described and their repellency determined. The 1,2,3,4-tetra hydro alpha naphthol was found to have a protective period of 85 minutes while 5,6,7,8-tetra hydro alpha naphthol had a repellent period of 56 minutes.

It has been ascertained that this characteristic of repellency is inherent in the naphthol chemical structure. For example, dihydroxy 1,5-naphtholene (1-5 naphthol) yields on hydrogenation 1-deca hydro naphthol, 1,5-deca hydro naphthol and unidentified isomers, the structures of which isomers are in process of being determined and are at present referred to for convenience as x-decahydro naphthols. The reaction proceeds as follows:

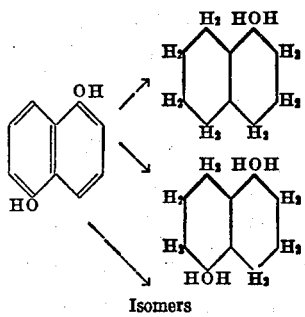
Isomers

Synthesis and separation was performed by dissolving 160 grams of 1,5-napthalene diol in 300 cc. of absolute alcohol. The solution was hydrogenated at 135 atmospheres of hydrogen at a temperature of 175° C. until the theoretical quantity of gas was absorbed.

The reaction product was subjected to fractional distillation and three fractions obtained. The first fraction was a liquid boiling at 115–150° C. under a vacuum of 15 mm. Hg and consisted principally of 1-decahydro naphthol. The second fraction was a solid having a melting point at 159–160° C. and which boiled at 175–180° C. at a vacuum of 15 mm. Hg and consisted of 1,5-decahydro naphthol. The third fraction consisted of isomers of decahydro naphthols boiling between 150–170° C. at a vacuum of 15 mm. Hg.

These three fractions were tested in the manner described. The 1-decahydro naphthol exhibited a protective period of 120 minutes, while the 1,5-decahydro naphthol protected for 110 minutes and the X-decahydro naphthol isomers protected for 132 minutes.

It has been ascertained as a result of extensive experimentation that the repellency of the described type of compound may be modified by the introduction of a substituent or functioning chemical radical into the described nuclei, for example, the hydrogenated naphthol type structure. It has been determined that the repellency of this basic type of structure may be markedly enhanced by substituting the proper functioning groups or radicals in the nucleus, an example of which is 2-ethanol 1,2,3,4-tetra hydro beta naphthol ether.

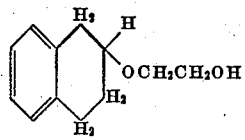

This substance was synthesized by adding 0.2 mol. of beta tetralol to 50 cc. of 10 per cent sodium hydroxide solution. Thereafter 0.1 mol. of 2-chloro ethanol was added slowly with vigorous stirring on each addition. When all of the 2-chloro ethanol was added the mixture was heated on a steam bath for 30 minutes. When cooled the mixture was extracted with ether and the ether layer was washed 5 times with 50 cc. water and the washings discarded. The ether layer was dried with sodium sulfate (anhydrous) and filtered. The ether was distilled off and the product distilled at 136–140° C. at a vacuum of 15 mm. Hg. The reaction proceeds as follows:

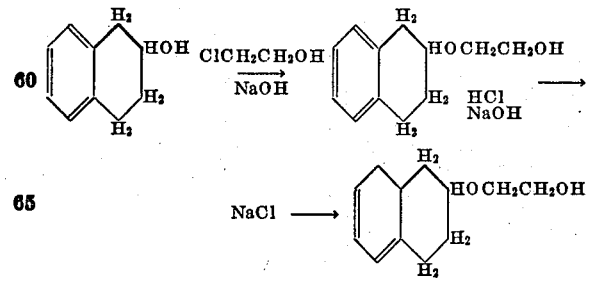

This compound was tested in the manner described and was found, surprisingly, to have a repellency of 360 minutes. From the above tests it will be observed that the introduction of a functioning group such as an ether in the hydrogenated naphthol basic nucleus strikingly enhanced the repellent action. Other ethers of hydrogenated naphthols were similarly found to present repellent action. For example, mono chloro acetyl 1,2,3,4-tetra hydro beta naphthol ester:

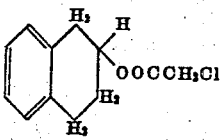

This substance exhibited a repellent period of 184 minutes.

This compound was prepared by adding 1 molecular portion of beta tetralol to 1 molecular proportion of monochloro acetyl chloride. When the vigorous evolution of gas subsides the reaction mixture was heated (reflux) for 30 minutes. The contents of the reaction vessel were then taken up in ether and washed with sodium hydroxide solution and finally with water. The ether was evaporated and the monochloracetic ether obtained. It was purified by distillation at 169–173° C. at a vacuum of 10 mm. Hg. The reaction is as follows:

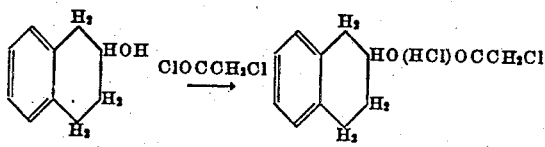

In view of the marked effect on repellency secured by the introduction of alkyl ethers in the basic repellent nucleus it might be assumed that other relatively simple alkyl radicals might function similarly.

The substitution of an ester group for an ether group in the basic nucleus might be expected to alter the basic repellent action of the hydrogenated naphthols.

To determine the effect of an ester substituent group in the basic hydrogenated naphthol nucleus the acetyl glycine ester of beta tetralol was investigated. This compound has the following formula:

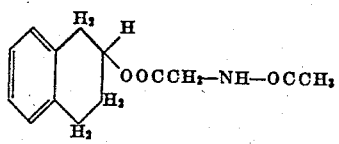

This substance was prepared in a flask fitted with a stirring apparatus and 38.8 grams of acetyl glycine added to 492 grams of beta tetralol. Since acetyl glycine is not soluble in beta tetralol anhydrous hydrochloric acid was added slowly to accomplish solution. The contents of the flask were then heated to 100° C., the viscous mass becoming clear and assuming a yellow green color. The HCl treatment was continued for an additional 30 minutes and the product was then washed with cold water and extracted with ether. The ether layer was washed with water and the ether removed by boiling leaving the acetyl glycine ester of beta tetralol.

The new compound was then treated in the manner described and was found to repel mosquitoes for 130 minutes.

The specificity of the substituent chemical radical in the basic repellent nucleus is illustrated by the repellent action of the isocaproic ester of beta tetralol.

The preparation of the iso-caproic ester of beta tetralol is accomplished by adding 0.2 mol of beta tetralol slowly to 0.2 mol of iso-caproyl chloride. When the vigorous evolution of gas ceases the flask is connected to a reflux condenser and the mixtures refluxed for 30 minutes. The crude material is then washed with dilute sodium hydroxide solution several times and then taken up in ether. The ether layer was separated, washed several times with water, then dried over sodium sulfate (anhydrous) and filtered. The ether was then removed by boiling leaving the caproic ester of beta tetralol.

This new compound when tested in the described manner displayed a repellent action of 27 minutes. It will be noted that in this instance an antagonistic action upon the basic nucleus is evident. Whereas, the unsubstituted compound, 1,2,3,4-tetra hydro beta naphthol possessed a repellency of 143 minutes, the introduction of the iso-caproic ester radical reduced the repellent period to 27 minutes.

In view of the fact that the hydrogenated naphthols, particularly the hydrogenated beta naphthols are highly effective as insect repellents it was desired to determine the effect of two such nuclei coupled together. To determine this effect the readily prepared di-beta tetralol ester of oxalic acid was prepared by adding equivalent molecular portions of oxalyl chloride to beta tetralol in a chilled vessel, taking care that the reaction mixture did not become heated. This was accomplished by continuous stirring and by adding the oxalyl chloride slowly. As the reaction continues a white crystalline mass separates, which was purified by thoroughly washing with water, dissolved in hot 95 per cent ethyl alcohol from which the di-1,2,3,4-tetra hydro naphthol ester of oxalic acid was recrystallized, having the following formula and a melting point of 60° C.

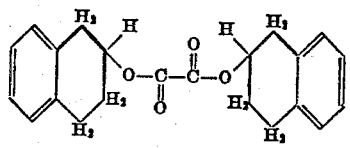

This compound was tested for repellency as formerly described and found to exhibit a repellent period of 226 minutes. In the course of this test a surprising effect developed. It was observed that during the course of the repellent test the few mosquitoes which contacted the skin were immediately killed. At the end of 226 minutes the mosquitoes alighted upon the arm in large numbers and it was assumed that the repellent activity of the compound had been lost; however, all the mosquitoes which alighted were promptly killed due to the insecticidal action of the compound. It is apparent therefore, that this type of compound possessed two properties, namely, repellency and lethal action.

Hydrogenated naphthols were then mixed with various other repellents and solvents to determine synergistic effects of such mixtures.

It was ascertained that mixtures of these two general types of repellents, namely, the hydrogenated naphthols and hydrogenated diphenyls may be formulated to produce unexpected and synergistic effects. For example, when 7 volumes of 2-phenyl cyclohexanol are mixed with 3 volumes of beta tetralol the resulting preparation was found to repel mosquitoes for an average of 408 minutes on dry skin and 178 minutes on moist or sweating skin. The composition therefore had a repellency which was considerably greater than that which was to be expected from any combination of these two constituents in an ultimate mixture. This synergistic action partakes of the specificity so characteristic of this group of compounds.

This is particularly significant when members of the hydrogenated naphthols are mixed with 2-phenyl cyclohexanol. The repellent period is prolonged and with the addition of 2-phenyl cyclohexanol the repellent becomes an all purpose repellent since the cyclohexanol component repels ticks, mites, and chiggers. However, be it noted, that synergism is not merely an improvement or a percentage increase of the repellent mixture but is dependent on the inter-action of the repellent components of definite proportion. For instance, ethyl alcohol which has a repellent action of 5 minutes when mixed with beta tetralol, extends the repellent period of tetralol on dry skin from 261 minutes to 307 minutes. On the other hand, isopropyl alcohol has an antagonistic action which results when mixed with beta tetralol in a decrease to 175 minutes. These values are higher than those previously given since they were determined under environmental conditions of 80° F. dry bulb and 70° F. wet bulb.

The mosquito repellent duration of mixtures of beta tetralol and 2 phenyl cyclohexanol under two types of environmental conditions are shown as follows:

| Percent (by volume) beta tetralol | Percent 2 phenyl cyclohexanol | Protection Period, minutes | | Synergic Index | |
|---|---|---|---|---|---|
| | | (a) 80° F. dry bulb, 70° F. wet bulb | (b) 90° F. dry bulb, 80° F. wet bulb | (a) | (b) |
| 30 | 70 | 451 | 178 | 1.35 | 1.16 |
| 50 | 50 | 370 | 122 | 1.15 | 1.07 |
| 70 | 30 | 303 | --- | 0.87 | ---- |

The mixture of thirty per cent beta tetralol and seventy per cent 2 phenyl cyclohexanol is referred to as NMRI-201 since this designation represents the experimental number in this study for 1945. A number of other substances having repellent properties either mixed with solvents or other repellents were found to be improved in their effectiveness. Some of these were cis bicyclo-5 heptene 2,3,dicarboxylic acid, dimethyl ester, n-n propylacetanilid, 1-3 cyclohexanadiol monoproprionate, propyl n-n, diethyl succinamate, hydracrylic acid, beta phenyl ethyl ester, p-n, propoxy benzaldehyde, and 2 meta tolyl cyclohexanol.

The effects of certain mixtures are as follows: Interaction of certain repellents and solvents against *Aedes aegypti* under 90° F. dry bulb and 80° F. wet bulb environmental temperature.

| Repellent (30 per cent) | Solvent (70 per cent) | Protection time, minutes |
|---|---|---|
| Ethanol 2 (beta tetralol) ether | | 360 |
| Do | 2 phenyl cyclohexanol | 400 |
| Monochloroacetyl (beta tetralol) ether | | 184 |
| Do | 2 phenyl cyclohexanol | 203 |
| Acetyl glycine ester of tetralol | | 131 |
| Do | 2 phenyl cyclohexanol | 380 |
| Ditetralol ester of oxalic acid | | 226 |
| Do | 2 phenyl cyclohexanol | 280 |
| Trans beta decalol | | 143 |
| Trans beta decalol oxalic acid | 2 phenyl cyclohexanol | 186 |

Synergism exists when any of the above repellents are mixed with ethyl or benzyl alcohol. A large number of repellents have been improved by a mixture of one or more of them. For instance, cis bicyclo-5 heptene 2,3,dicarboxylic acid has an increase of 30 per cent in its protection period when mixed with ethyl or benzyl alcohol or when mixed with beta tetralol or 2 phenyl cyclohexanol.

While preferred formulas of the invention have been described, it is to be understood that these are given to typify the range of potential specific use and not to limit the scope of the application to the specific physical embodiment herein described.

The invention herein described may be manufactured and used by or for the Government of the United States without the payment of any royalties thereon or therefor.

We claim:

1. An insect repellent mixture comprising essentially a predetermined quantity of a hydrogenated naphthol having at least one ring saturated with hydrogen and a preponderant amount of a hydrogenated diphenyl having at least one ring saturated with hydrogen.

2. An insect repellent mixture comprising substantially 3 parts by volume of 1,2,3,4-tetra hydro beta naphthol and 7 parts by volume 2-phenyl cyclohexanol.

3. An insect repellent composition comprising substantially 3 parts by volume of 1,2,3,4-tetra hydro beta naphthol and 7 parts of 2-phenyl cyclohexanol dissolved in ethyl alcohol.

4. An insect repellent composition comprising substantially 3 parts by volume of 1,2,3,4-tetra hydro beta naphthol and 7 parts of 2-phenyl cyclohexanol dissolved in benzyl alcohol.

MICHEL PIJOAN.
LEO A. JACHOWSKI, JR.

REFERENCES CITED

The following references are of record in the file of this patent:

UNITED STATES PATENTS

| Number | Name | Date |
|---|---|---|
| 1,842,993 | Marx et al. | Jan. 26, 1932 |
| 2,005,797 | Moore | June 25, 1935 |
| 2,073,683 | Christiansen et al. | Mar. 16, 1937 |
| 2,100,468 | Brubaker et al. | Nov. 30, 1937 |
| 2,136,022 | Pirie | Nov. 8, 1938 |
| 2,164,328 | Hay | July 4, 1939 |
| 2,396,013 | Jones | Mar. 5, 1946 |

OTHER REFERENCES

Richter's Organic Chemistry, translation of the eleventh German edition by D'Albe, Blakiston's Son & Co., Philadelphia, volume 2, pages 685, 686, 687. (Available in Division 43 of Patent Office.)

"Handbook of Chemistry and Physics," edited by Hodgman and Holmes, 26th edition, published in Cleveland, Ohio, 1942, by Chemical Rubber Publishing Co., page 894.